No. 636,145. Patented Oct. 31, 1899.
P. S. HOUGHTON.
PUMP VALVE STEM.
(Application filed June 30, 1899.)
(No Model.)
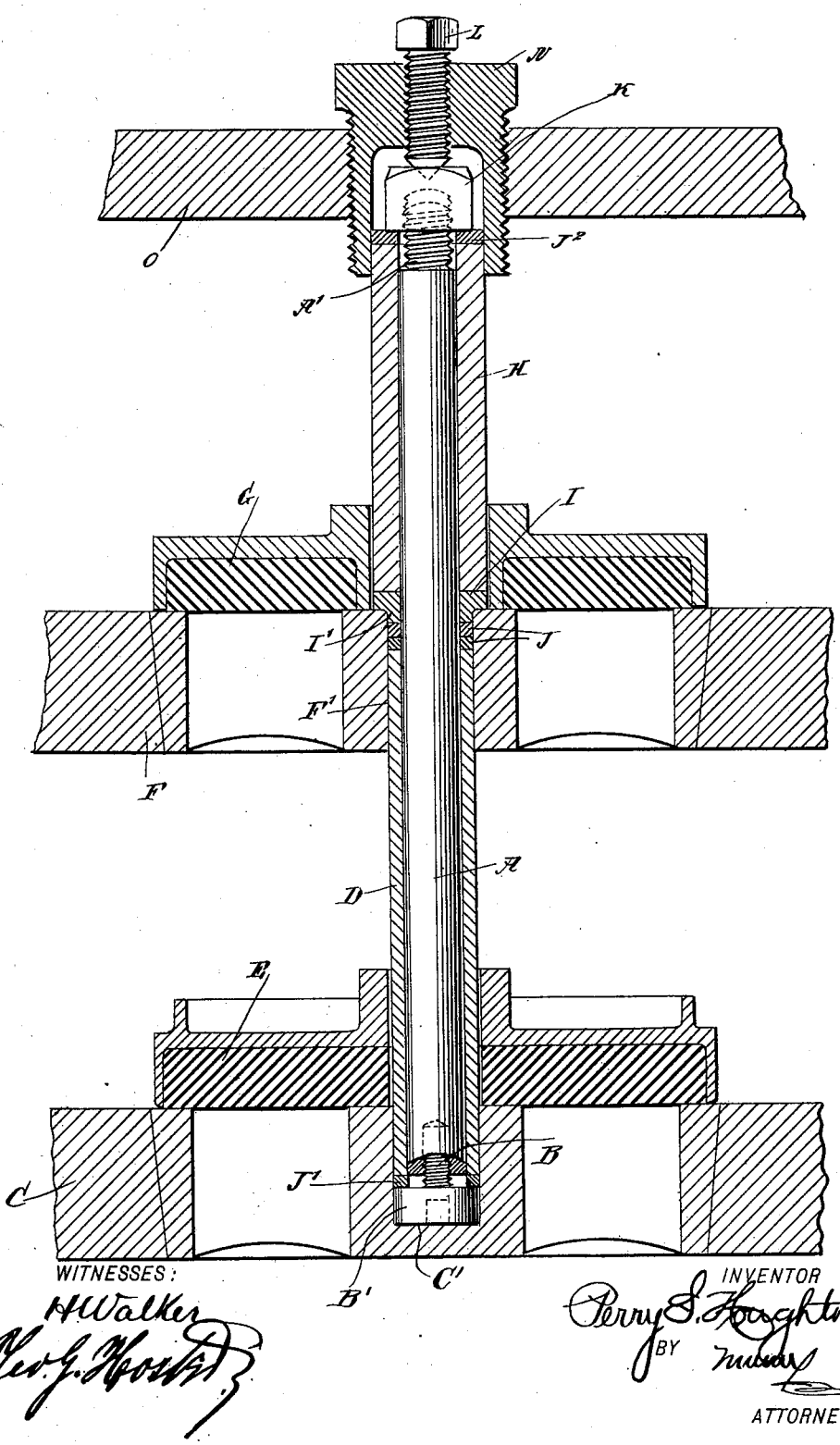
WITNESSES:
H Walker
Rev. J. Hoskit
INVENTOR
Perry S. Houghton
BY
ATTORNEYS
THE NORRIS PETERS CO., PHOTO-LITHO., WASHINGTON, D. C.

UNITED STATES PATENT OFFICE.

PERRY SPEELMAN HOUGHTON, OF LINDSEY, PENNSYLVANIA.

PUMP-VALVE STEM.

SPECIFICATION forming part of Letters Patent No. 636,145, dated October 31, 1899.

Application filed June 30, 1899. Serial No. 722,405. (No model.)

*To all whom it may concern:*

Be it known that I, PERRY SPEELMAN HOUGHTON, of Lindsey, in the county of Jefferson and State of Pennsylvania, have invented a new and Improved Pump-Valve Stem, of which the following is a full, clear, and exact description.

The object of the invention is to provide a new and improved pump-valve stem which is simple and durable in construction, not liable to bend and bind the valve in its opening and closing movement, and arranged to permit of reversing the wearing-surface to give long life to the stem.

The invention consists of novel features and parts and combinations of the same, as will be fully described hereinafter and then pointed out in the claims.

Reference is to be had to the accompanying drawing, forming a part of this specification, in which the figure is a sectional side elevation of the improvement.

The improved pump-valve stem is provided with a rod A, in the lower end of which screws a screw B, the head B' of which is seated in the bottom of a recess C', formed in the top of the valve-seat C. On the rod A is held a sleeve D for the valve E for the seat C to slide on, the sleeve thus forming a bearing for the said valve E, the sleeve being seated with its lower end in the recess C' in the valve-seat C. The upper end of the sleeve D fits into the bore F' of the valve-seat F for an upper valve G, mounted to slide on a sleeve H, held on the upper portion of the rod A. The lower end of the sleeve H is seated on a collar I, seated on the top of the valve-seat F and having a reduced portion I' extending into the bore F'. The collar I is preferably made of copper or other soft metal to form a firm joint with the sleeve H and the valve-seat F. In order to compensate for any difference in height between the seats C and F, I employ washers J, held on the rod A between the upper end of the sleeve D and the collar I. Similar washers J' for the same purpose may be interposed between the lower end of the sleeve D and the head B' of the screw B. On the extreme upper threaded end A' of the rod A screws a nut K, engaging either the upper end of the sleeve H or a washer $J^2$, set on the sleeve, to securely lock the sleeve H in place on the rod A. The top of the nut K is formed with a seat for the pointed end of a set-screw L, screwing in a threaded bushing or cap N, screwing in the top O of the pump, with the inner end of the bushing engaging and inclosing the upper end of the sleeve H, the washer $J^2$, and the nut K. By adjusting the set-screw L the several parts of the improved valve-stem are securely held in position.

Now by the construction described the sleeves D and H form bearings for the valves E and G to slide on, and in case the lower ends of said sleeves are worn they can be readily reversed, so as to present new bearing-surfaces for the valves to slide on.

In order to take the valve-stem out for the purpose mentioned, it is necessary to remove the bushing N with the set-screw and to lift the stem from the pump. The screw B and the nut K can then be readily removed to permit of sliding the sleeves off the stem for reversing the sleeves and placing the same in a reversed position back on the rod. The several parts are then again fastened together by the screw B and nut K, and then the rod is secured to the valve-seats C and F, the valves E and G being mounted to slide on the sleeves. The washers J, J', and $J^2$ serve to conveniently lengthen the sleeves, to bring the latter into proper position relatively to the valves E and G, and also to bring the sleeves in proper relation to the valve-seats D and F.

By the construction described the liquid pumped by the pump on which the device is used does not reach the steel or iron rod A, and consequently such liquid has no corrosive action whatever on the rod, especially as the packing-rings prevent the liquid from passing to the rod.

Having thus fully described my invention, I claim as new and desire to secure by Letters Patent—

1. A pump-valve stem provided with a central rod arranged for attachment to valve-seats, a screw held in one end of said rod and having a head of greater diameter than the rod, a sleeve inserted on said rod and forming a sliding bearing for a valve, and washers on said rod and forming a water-tight connection between the sleeves and the valve-seats, one of said washers being interposed between the lower edge of the sleeve and the head of the screw, as set forth.

2. A pump-valve stem, provided with a central rod for attachment to the valve-seats, a plurality of sleeves on said rod, each sleeve forming a bearing for a valve, and a collar held on said rod and adapted to be seated on one of the valve-seats and forming a rest for the upper sleeve, substantially as shown and described.

3. A pump-valve stem, provided with a central rod for attachment to the valve-seats, a plurality of sleeves on said rod, each sleeve forming a bearing for a valve, a collar held on said rod and adapted to be seated on one of the valve-seats and forming a rest for the upper sleeve, and washers on said rod, substantially as shown and described.

4. A pump-valve stem, provided with a central rod for attachment to the valve-seats, a plurality of sleeves on said rod, each sleeve forming a bearing for a valve, a collar held on said rod and adapted to be seated on one of the valve-seats and forming a rest for the upper sleeve, a screw screwing in one end of the rod, and a nut screwing on the other end of the rod, substantially as shown and described.

5. A pump-valve stem, provided with a central rod for attachment to the valve-seats, a plurality of sleeves on said rod, each sleeve forming a bearing for a valve, a collar held on said rod and adapted to be seated on one of the valve-seats and forming a rest for the upper sleeve, a screw screwing in one end of the rod, a nut screwing on the other end of the rod, a set-screw for engaging the said nut, and a bushing carrying the set-screw and engaging the upper end of the upper sleeve, substantially as shown and described.

PERRY SPEELMAN HOUGHTON.

Witnesses:
CHARLES E. RATZ,
WILLIAM WATKINS.